(12) United States Patent
Tang

(10) Patent No.: US 12,170,974 B2
(45) Date of Patent: Dec. 17, 2024

(54) LATENCY COMPENSATION METHOD, DEVICE AND STORAGE MEDIUM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 152 days.

(21) Appl. No.: 17/547,489

(22) Filed: Dec. 10, 2021

(65) Prior Publication Data
US 2022/0104160 A1  Mar. 31, 2022

Related U.S. Application Data

(63) Continuation of application No. PCT/CN2019/092801, filed on Jun. 25, 2019.

(51) Int. Cl.
*H04W 56/00* (2009.01)

(52) U.S. Cl.
CPC .............................. *H04W 56/0045* (2013.01)

(58) Field of Classification Search
None
See application file for complete search history.

(56) References Cited

U.S. PATENT DOCUMENTS

2014/0369389 A1  12/2014  Sang et al.
2020/0322908 A1*  10/2020  Prakash .............. H04W 56/004
2021/0345272 A1*  11/2021  Chatterjee .......... H04W 56/0045
2022/0039045 A1*  2/2022  Sun .................... H04W 56/0015
2022/0201636 A1*  6/2022  Liu ...................... H04W 76/20

FOREIGN PATENT DOCUMENTS

CN         1859743 A      11/2006
CN       100426927 C      10/2008

OTHER PUBLICATIONS

International Search Report (ISR) dated Mar. 17, 2020 for Application No. PCT/CN2019/092801.
OPPO. "Time Synchronization in IIoT, R2-190644" 3GPP TSG-RAN WG2 Meeting #106, Reno, US, May 13-17m 2019, May 2, 2019(May 2, 2019), entire document.

* cited by examiner

*Primary Examiner* — Saad Khawar
(74) *Attorney, Agent, or Firm* — Ladas & Parry LLP

(57) ABSTRACT

The present application provides a latency compensation method, a device, and a storage medium, comprising: a UE or a base station acquiring a latency compensation parameter, and performing latency compensation for reference time information according to the latency compensation parameter; and the UE performing time synchronization with the base station according to the reference time after compensation information. By performing latency compensation for the reference time information, an error of the reference time information caused by a propagation latency between the base station and the UE may be compensated, such that the reference time information is more accurate, and the time synchronization accuracy, which the UE subsequently performs time synchronization by using the reference time information after latency compensation to obtain, is improved.

12 Claims, 8 Drawing Sheets

A base station generates a first latency compensation information, the first latency compensation information being used by a UE to determine whether to perform latency compensation for reference time information — S201

The base station sends the first latency compensation information to the UE — S202

LATENCY COMPENSATION METHOD, DEVICE AND STORAGE MEDIUM

CROSS-REFERENCE TO RELATED APPLICATIONS

This application is a continuation of International Application No. PCT/CN2019/092801, filed on Jun. 25, 2019, the content of which is incorporated herein by reference in its entirety.

TECHNICAL FIELD

Embodiments of the present application relate to communication technology, and in particular, to a latency compensation method, a device and a storage medium.

BACKGROUND

With the rapid development of communication technology, the fifth generation mobile communication (5 Generation, 5G for short) network is gradually being widely used. 5G network mainly includes the following types of services: Enhanced mobile broadband (Enhanced mobile broadband, eMBB), Massive Machine Type Communications (Massive Machine Type Communications, mMTC for short) and Ultra-reliable and Low Latency Communications (Ultra-reliable and Low Latency Communications, URLLC) services.

Different services have different requirements for time synchronization (or called clock synchronization) accuracy. Taking the URLLC service as an example, the URLLC service requires a 5G network to provide the guarantee for lower latency and higher time synchronization accuracy. In the traditional scheme, the user equipment (user equipment, UE for short) determines the transmission advance of uplink frames during uplink transmission according to the timing advance (timing advance, TA for short) sent by the base station, and sends the uplink frames to the base station in advance according to the transmission advance, so that the uplink frames arrive at the base station at the expected time, thereby compensating for the latency of the radio frequency transmission caused by a distance.

However, the above solution still cannot meet the requirements of UE for time synchronization.

SUMMARY

Embodiments of the present application provide a latency compensation method, a device and a storage medium, which improve time synchronization accuracy of UE and network side by performing compensation for reference time.

In a first aspect, embodiments of the present application may provide a latency compensation method, the method includes:
acquiring, by a UE, a latency compensation parameter; and
performing, by the UE, latency compensation for a reference time information according to the latency compensation parameter.

In a second aspect, embodiments of the present application may provide a latency compensation method, the method includes:
generating, by a base station, a first latency compensation information, the first latency compensation information being used by a user equipment (UE) to determine whether to perform latency compensation for a reference time information; and
sending, by the base station, the first latency compensation information to the UE.

In a third aspect, embodiments of the present application may provide a latency compensation method, the method includes:
acquiring, by a base station, a latency compensation parameter;
performing, by the base station, latency compensation for a reference time information according to the latency compensation parameter; and
sending, by the base station, the reference time information after latency compensation to a UE.

In a fourth aspect, embodiments of the present application may provide a UE, including:
an acquiring module, configured to acquire a latency compensation parameter; and
a compensating module, configured to perform latency compensation for a reference time information according to the latency compensation parameter.

In a fifth aspect, embodiments of the present application may provide a base station, including:
a generating module, configured to generate a first latency compensation information, the first latency compensation information being used by the user equipment (UE) to determine whether to perform latency compensation for a reference time information; and
a sending module, configured to send the first latency compensation information to the UE.

In a sixth aspect, embodiments of the present application may provide a base station, including:
an acquiring module, configured to acquire a latency compensation parameter;
a compensating module, configured to perform latency compensation for a reference time information according to the latency compensation parameter; and
a sending module, configured to send the reference time information after latency compensation to a user equipment (UE).

In a seventh aspect, embodiments of the present application may provide a UE, including:
a processor, a memory, an interface for communication with a terminal device;
the memory stores computer execution instructions; and
the processor executes the computer-executable instructions stored in the memory, so that the processor executes the latency compensation method according to the first aspect.

In an eighth aspect, embodiments of the present application may provide a base station, including:
a processor, a memory, an interface for communication with a terminal device;
the memory stores computer execution instructions; and
the processor executes the computer-executable instructions stored in the memory, so that the processor executes the latency compensation method according to the second aspect.

In a ninth aspect, embodiments of the present application may provide a base station, including:
a processor, a memory, an interface for communication with a terminal device;
the memory stores computer execution instructions; and
the processor executes the computer-executable instructions stored in the memory, so that the processor executes the latency compensation method according to the third aspect.

In a tenth aspect, embodiments of the present application may provide a computer-readable storage medium, wherein computer execution instructions are stored in the computer-readable storage medium, and used to implement the latency compensation method according to the first aspect when the computer execution instructions are executed by a processor.

In an eleventh aspect, embodiments of the present application may provide a computer-readable storage medium, wherein computer execution instructions are stored in the computer-readable storage medium, and used to implement the latency compensation method according to the second aspect when the computer execution instructions are executed by a processor.

In a twelfth aspect, embodiments of the present application may provide a computer-readable storage medium, wherein computer execution instructions are stored in the computer-readable storage medium, and used to implement the latency compensation method according to the third aspect when the computer execution instructions are executed by a processor.

In a thirteenth aspect, embodiments of the present application provide a program for performing the latency compensation method according to the first aspect above when the program is executed by a processor.

In a fourteenth aspect, embodiments of the present application provide a program for performing the latency compensation method according to the second aspect above when the program is executed by a processor.

In a fifteenth aspect, embodiments of the present application provide a program for performing the latency compensation method according to the third aspect above when the program is executed by a processor.

In a sixteenth aspect, embodiments of the present application provide a computer program product including program instructions, and the program instructions are used to implement the latency compensation method described in the first aspect above.

In a seventeenth aspect, embodiments of the present application provide a computer program product including program instructions, and the program instructions are used to implement the latency compensation method described in the second aspect above.

In an eighteenth aspect, embodiments of the present application provide a computer program product including program instructions, the program instructions are used to implement the latency compensation method described in the third aspect above.

In a nineteenth aspect, embodiments of the present application provide a chip, including a processing module and a communication interface, and the processing module is capable of performing the latency compensation method according to the first aspect above.

Further, the chip further includes a storage module (for example, a memory), the storage module is configured to store instructions, the processing module is configured to execute instructions stored in the storage module, and the execution of the instructions stored in the storage module causes the processing module to perform the latency compensation method according to the first aspect.

In a twentieth aspect, embodiments of the present application provide a chip, including a processing module and a communication interface, and the processing module is capable of performing the latency compensation method according to the second aspect above.

Further, the chip further includes a storage module (for example, a memory), the storage module is configured to store instructions, the processing module is configured to execute instructions stored in the storage module, and the execution of the instructions stored in the storage module causes the processing module to perform the latency compensation method according to the second aspect.

In a twenty-first aspect, embodiments of the present application provide a chip, including a processing module and a communication interface, and the processing module is capable of performing the latency compensation method according to the third aspect above.

Further, the chip further includes a storage module (for example, a memory), the storage module is configured to store instructions, the processing module is configured to execute instructions stored in the storage module, and the execution of the instructions stored in the storage module causes the processing module to perform the latency compensation method according to the third aspect.

The present application provides a latency compensation method, a device, and a storage medium, including: a UE or a base station acquiring a latency compensation parameter, and performing latency compensation for reference time information according to the latency compensation parameter; and the UE performing time synchronization with the base station according to the reference time after compensation information. By performing latency compensation for the reference time information, an error of the reference time information caused by a propagation latency between the base station and the UE may be compensated, such that the reference time information is more accurate, and the time synchronization accuracy, which the UE subsequently performs time synchronization by using the reference time information after latency compensation to obtain, is improved.

BRIEF DESCRIPTION OF DRAWINGS

The accompanying drawings herein are incorporated into the specification and constitute a part of the specification, illustrate embodiments in accordance with the present disclosure, and are used with the specification to explain the principle of the present disclosure.

Through the above-mentioned drawings, the specific embodiments of the present disclosure have been shown, which will be described in more detail below. These drawings and text descriptions are not intended to limit the scope of the inventive concept of the disclosure in any way, but illustrate the concept of the present disclosure to those skilled in the art by referring to specific embodiments.

DESCRIPTION OF EMBODIMENTS

In order to make the purpose, technical solutions and advantages of the embodiments of the present application clearer, the technical solutions in the embodiments of the present application will be described clearly and completely with the accompanying drawings in the embodiments of the present application. Obviously, the described embodiments are a part of the embodiments of the present application, but not all of them. Based on the embodiments in the present application, all other embodiments obtained by those skilled in the art without creative work fall within the protection scope of the present application.

The terms "first", "second", etc. in the specification, claims, and accompanying drawings of the embodiments of the present application are used to distinguish similar objects, and are not necessarily used to describe a specific order or sequence. It should be understood that the data used in this way may be interchanged under appropriate circumstances, so that the embodiments of the present application described herein may be implemented, for example, in a sequence other than those illustrated or described herein. In addition, the terms "include" and "have" and any variations of them are intended to cover non-exclusive inclusions. For example, a process, method, system, product, or device that includes a series of steps or units is not necessarily limited to those clearly listed steps or units, but may include other steps or units that are not clearly listed or are inherent to these processes, methods, products, or device.

Figure 1:
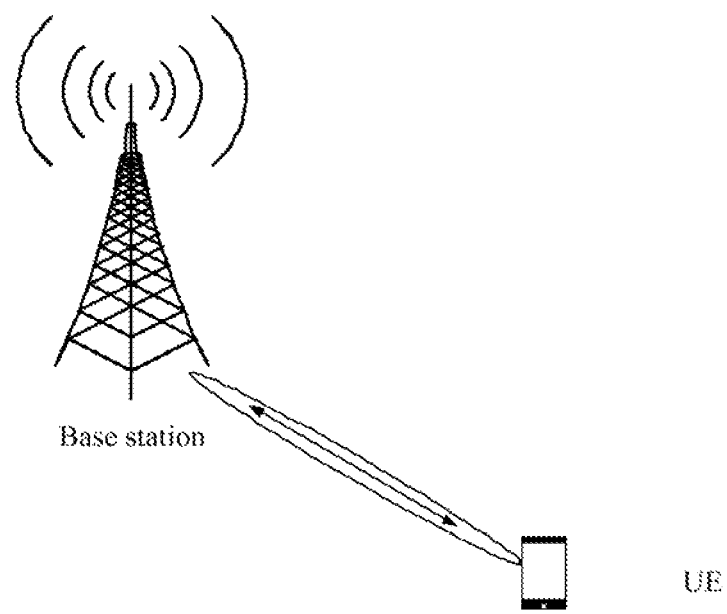
FIG. 1 is a schematic diagram of an architecture of a communication system to which embodiments of the present disclosure are applicable.

Embodiments of the present application provide a latency compensation method, and FIG. 1 is a schematic diagram of an architecture of a communication system to which embodiments of the present disclosure are applicable, as shown in FIG. 1, the communication system includes a base station and a plurality of terminal devices. The communication system may be a Global System of Mobile communication (Global System of Mobile communication, GSM for short), a Code Division Multiple Access (Code Division Multiple Access, CDMA for short) system, a Wideband Code Division Multiple Access (Wideband Code Division Multiple Access, WCDMA for short) system, a Long Term Evolution (Long Term Evolution, LTE for short) system, or a 5th-Generation (5th-Generation, 5G for short) system. Correspondingly, the base station may be a Base Transceiver Station (Base Transceiver Station, BTS for short) in a GSM system or CDMA system, a NodeB (NodeB, NB for short) in a WCDMA system, or an evolved NodeB (evolved NodeB, eNB for short), an access point (access point, AP) or a relay station in an LTE system, or a base station in a 5G system, etc., without any limitation here.

The terminal device is also called as User Equipment (User Equipment, UE), and the terminal device may be: a cell phone, a computer, and may also be a cellular phone, a cordless phone, a session initiation protocol (Session Initiation Protocol, SIP) phone, a smartphone, a wireless local loop (Wireless Local Loop, WLL) station, a personal digital assistant (Personal Digital Assistant, PDA), a computer, a laptop, a handheld communication device, a handheld computing device, a satellite wireless device, a wireless modem card, a set top box (Set Top Box, STB), an automotive device, a wearable device, a smart home device, an industrial device, other device used to communicate on wireless systems, etc.

The premise for the base station and the UE to ensure normal communication is that the UE and the base station maintain time synchronization (or called as clock synchronization). In the prior art, the network side device sends time synchronization information and time synchronization accuracy (accuracy) to the UE, and the UE performs time synchronization with the base station according to the time synchronization information and time synchronization accuracy to meet the time synchronization and synchronization accuracy between the UE and a reference clock. The network side device may send the time synchronization information and time synchronization accuracy to the UE by carrying them in an RRC message or a broadcast message. Specifically, the carried information element (IE) may be a TimeReferenceInfo information element.

Figure 2:
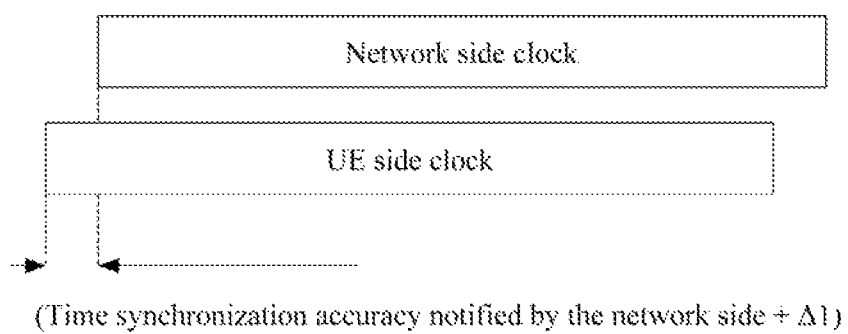
FIG. 2 is a schematic diagram of time synchronization of a UE and a network side device.

FIG. 2 is a schematic diagram of time synchronization of a UE and a network side device, as shown in FIG. 2, the time synchronization accuracy on the UE side is related to the time synchronization accuracy notified by the network side and the time synchronization accuracy error $\Delta1$ on the UE side, and the time synchronization accuracy error $\Delta1$ on the UE side is determined by the physical layer and related to many factors such as propagation loss and equipment limitation, etc.

Among them, different services needs have different requirements on time synchronization accuracy, some services have high requirements on time synchronization accuracy and some services have low requirements on time synchronization accuracy. For example, the Industrial Internet of Things (Industrial Internet of Things, IIoT for short) service has high requirements on latency and reliability, and in many cases, it needs to meet the time synchronization accuracy requirement of 1 μs.

The IIoT may connect hundreds of millions of industrial devices to the Internet, collect data through sensors installed on these industrial devices and transmit them to a control center, and the control center processes the data to manage and control the devices. The industrial devices in IIoT may transmit data through an existing communication system (such as LTE or 5G system).

The birth of the 5G system enables the IIoT to support more services such as Factory Automation (Factory Automation), Transport Industry (Transport Industry), and Electrical Power Distribution (Electrical Power Distribution). Since the IIoT service has higher requirements for latency and reliability, a time sensitive network (Time Sensitive Network, TSN for short) is introduced into the IIoT based on this. As a bridge of the TSN, the 5G network plays a vital role in the TSN.

In the TSN, the 5G network needs to provide the guarantee for lower latency and higher clock synchronization accuracy, so that when the TSN service is transmitted in the 5G network, the operation and connection of each point of the mechanical operation are accurate and meet the time requirements.

Figure 3:
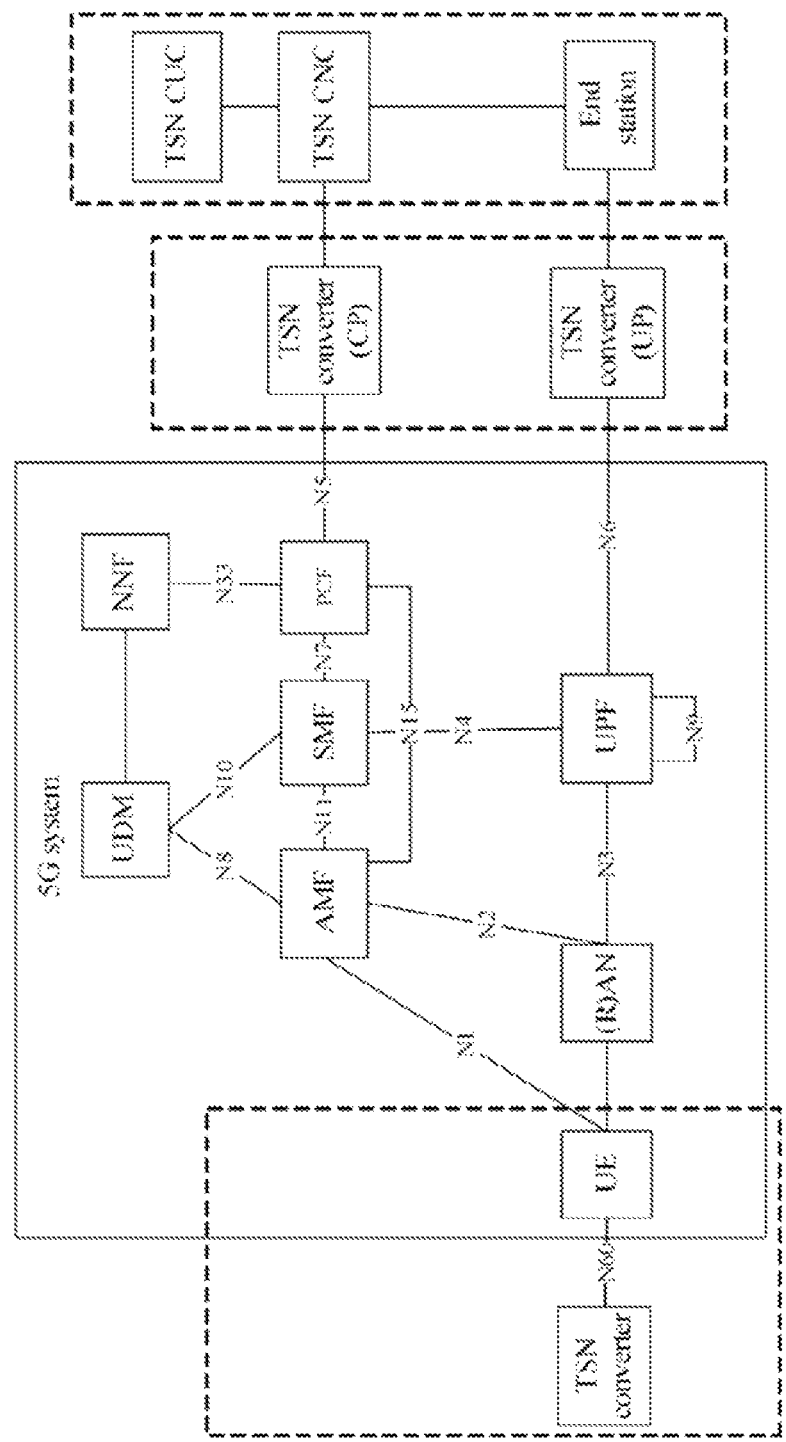
FIG. 3 is a schematic diagram of a TSN network architecture.

FIG. 3 is a schematic diagram of a TSN network architecture, as shown in FIG. 3, the TSN network includes a 5G system, a user-side TSN converter, a network-side TSN converter, and a TSN control center. Among them, the user-side TSN converter is connected to the UE through an interface N60, and is configured to perform operations such as protocol and format conversion on the data of the UE. The TSN converter on the network side includes a user plane (user plan, UP) converter and a control plane (control plane, CP for short) converter. The UP converter is configured to perform operations such as protocol and format conversion on UP data, and the CP converter is configured to perform operations such as protocol and format conversion on CP data.

The TSN control center includes a TSN Centralized User Configuration (Centralized User Configuration, CUC for short) node, a TSN Centralized Network Configuration (Centralized Network Configuration, CNC for short) node, and an end station (end station). Among them, the TSN CUC is configured to adjust the TSC stream requirement of the TSN end station, and the TSN CNC is configured to uniformly control the stream transmission of the TSC network, the end station is a TSN talker and a TSN listener, representing each network node that sends or receives a TSC service.

The 5G system is also called as a New Radio (New Radio, NR) or a next-generation mobile communication system. As shown in FIG. 3, the 5G system includes: an access network (access network, AN) and a core network.

The AN in the 5G system may be a radio access network (radio access network, RAN) or a wired AN, and the AN device (RAN device or wired AN device) in the 5G system may consist of multiple 5G-AN nodes. The 5G-AN nodes may include: an access point (access point, AP) of a non-3GPP access network (such as an access point of a WiFi network), and next-generation base stations. The next-generation base stations may be collectively referred to as a new-generation radio access network node (NG-RAN node). Among them, the next-generation base stations include an NR nodeB (gNB), a new-generation evolved base station (NG-eNB), a central unit (central unit, CU) and a distributed unit (distributed unit, DU), a separate gNB, etc., a transmission receive point (transmission receive point, TRP), a transmission point (transmission point, TP) or other nodes.

The core network of the 5G system includes a plurality of functional units, such as an Access and Mobility Management Function (Access and Mobility Management Function, AMF) network element, a Session Management Function (Session Management Function, SMF) network element, a User Plane Function (User Plane Function, UPF) network element, an Authentication Server Function (Authentication Server Function, AUSF) network element, a Policy Control Function (Policy Control Function, PCF) network element, and an Application Function (Application Function, AF) network element, a Unified Data Management (unified data management, UDM) network element, a Network Slice Selection Function (Network Slice Selection Function, NSSF) network element.

The AMF network element is mainly responsible for mobility management, access management, etc. The SMF network element is mainly responsible for session management, UE address management and assignment, dynamic host configuration protocol functions, selection and control of user-plane functions, etc. The UPF is mainly responsible for external connection to a data network (data network, DN) and user-plane packet routing and forwarding, message filtering, performing quality of service (quality of service, QoS) control-related functions, etc. The AUSF is mainly responsible for authentication of the terminal device, etc.

The PCF network element is mainly responsible for providing a unified policy framework for network behavior management, providing policy rules for control plane functions, and acquiring registration information related to policy decisions, etc. It should be noted that these functional units may work independently or be combined together to achieve certain control functions, such as access control and mobility management functions for access authentication, security encryption, location registration of the terminal device, and session management functions such as the establishment, release and modification of user plane transmission paths.

The next generation network (next generation, NG) interface may be configured to communicate between functional units in the 5G core network. For example, the UE may transmit control-plane messages with the AMF network element through next generation (NG) interface 1 (N1 for short), the RAN device may establish a user-plane data transmission channel with the UPF through NG interface 3 (N3 for short), the AN/RAN device may establish a control-plane signaling connection with the AMF network element through NG interface 2 (N2 for short), the UPF may exchange information with the SMF network element for messages through NG interface 4 (N4 for short), the UPF may interact with the data network DN for user-plane data through NG interface 6 (N6 for short), and the AMF network element may exchange information with the SMF network element for messages through NG interface 11 (N11 for short), the SMF network element may exchange information with the PCF network element through NG interface 7 (N7 for short), and the AMF network element may exchange information with the AUSF through NG interface 12 (N12 for short). It should be noted that FIG. 3 is only an exemplary architecture diagram, and the network architecture may include other functional units in addition to the functional units shown in FIG. 3.

The UP converter connects and communicates with the UPF network element in the 5G system, and the UP converter can be connected to the UPF network element through an N6 interface. The CP converter connects and communicates with the PCF network element in the 5G system, and the CP converter can be connected to the PCF network element through an N5 interface. In an implementation, the CP converter may be an AP network element.

In the related art, the UE performs time synchronization according to the synchronization time information sent by the base station. Because the transmission delay exists between the base station and the UE, the synchronization time information sent by the base station to the UE may be inaccurate due to the transmission delay, which makes the synchronization accuracy between the UE and the base station cannot meet service requirements.

In the embodiment of the present application, the reference time information is used for time synchronization between the UE and the base station, and the time synchronization between the UE and the base station includes: acquiring time synchronization accuracy, or, meeting the time synchronization accuracy of the UE and the reference clock. The time reference information includes reference time and/or reference frame (reference SFN).

In the embodiment of the present application, the reference time includes at least one of the following time information: days (refDays), seconds (refSeconds), milliseconds (refMilliSeconds), microseconds (refQuarterMicroSeconds), ten nanoseconds (ref10NaroSeconds), and nanoseconds (ref50NaroSeconds).

In the embodiment of the present application, the reference frame is identified by a system frame number (System Frame Number, SFN for short) of the reference frame.

In the embodiment of the present application, the latency compensation parameter is used to perform latency compensation for the reference time information, the latency compensation parameter may be a latency compensation value or an index value corresponding to the latency compensation value, and the latency compensation value is a specific time value. The latency compensation parameter may also be a latency compensation coefficient (or referred to as a latency compensation factor), and the value of the latency compensation coefficient is greater than zero.

The embodiment of the present application does not limit the specific form of the latency compensation parameter, it can be understood that different latency compensation parameters correspond to different compensation algorithms, for example, when the latency compensation parameter is a latency compensation value, and the latency compensation value is added to or subtracted from the reference time to acquire a reference time after compensation. When the latency compensation parameter is an index of the latency compensation value, the corresponding latency compensation value is found according to the index value, and the latency compensation value is added to or subtracted from the reference time to acquire the reference time after compensation. When the latency compensation parameter is a latency compensation coefficient, the reference time is multiplied by the latency compensation coefficient to acquire the reference time after compensation. When the latency compensation parameter is a latency compensation coefficient, a predefined value may also be multiplied by the latency compensation coefficient to acquire a latency compensation value, and the latency compensation value is added to or subtracted from the reference time to acquire the reference time after compensation.

In order to solve the problems of the prior art, Embodiment 1 of the present disclosure provides a latency compensation method. In the method, the UE performs latency compensation for the reference time information, and the reference time information after compensation is more accurate, thereby improving the synchronization accuracy between the UE and the base station.

The latency compensation method provided by the embodiment of the present disclosure can be applied to any scenario that requires time synchronization, and is not limited to the services that require high time synchronization accuracy, such as URLLC service or IIoT service.

Embodiment 1

Figure 4:
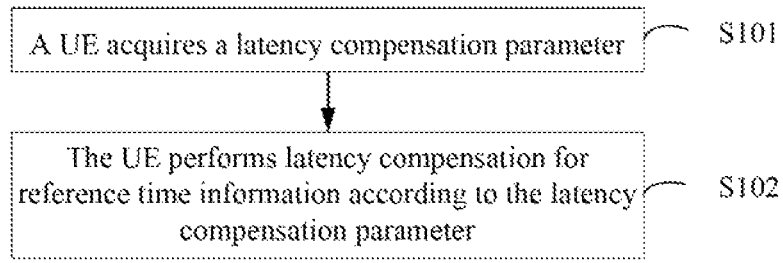
FIG. 4 is a flowchart of a latency compensation method provided by Embodiment 1 of the present disclosure.

FIG. 4 is a flowchart of a latency compensation method provided by Embodiment 1 of the present disclosure, as shown in FIG. 4, the method provided in the present embodiment includes the following steps:

S101. A UE acquires a latency compensation parameter.

The latency compensation parameter is used to perform latency compensation for reference time information, and the latency compensation parameter may be a latency compensation value or an index value corresponding to the latency compensation value, where the latency compensation value is a specific time value. The latency compensation parameter may also be a latency compensation coefficient (or a latency compensation factor), and the latency compensation coefficient takes a value greater than 0.

S102. The UE performs latency compensation for reference time information according to the latency compensation parameter.

The reference time information includes a reference time and/or a reference frame (reference SFN). In the present embodiment, the reference time includes at least one of the following time information: days (refDays), seconds (refSeconds), milliseconds (refMilliSeconds), microseconds (refQuarterMicroSeconds), ten nanoseconds (ref10NaroSeconds) and nanoseconds (ref50NaroSeconds). In the present embodiment, the reference frame is identified by an SFN of the reference frame.

It can be understood that different latency compensation parameters correspond to different compensation algorithms, for example, when the latency compensation parameter is a latency compensation value, the latency compensation value is added to or subtracted from the reference time to acquire a reference time after compensation. When the latency compensation parameter is an index of the latency compensation value, the corresponding latency compensation value is found according to the index value, and the latency compensation value is added to or subtracted from the reference time to acquire the reference time after compensation. When the latency compensation parameter is a latency compensation coefficient, the reference time is multiplied by the latency compensation coefficient to acquire the reference time after compensation, and the reference time after compensation is increased or decreased with respect to the original reference time. When the latency compensation parameter is a latency compensation coefficient, a predefined value may also be multiplied by the latency compensation coefficient to acquire a latency compensation value, and the latency compensation value is added to or subtracted from the reference time to acquire the reference time after compensation.

In the embodiment of the present application, by performing the latency compensation for the reference time information, it is equivalent to offsetting the reference time information by an X.

After the UE performs latency compensation for the reference time information, it may perform time synchronization with the base station according to the reference time information after latency compensation. The specific synchronization method refers to an existing solution, which is not described in detail in the present embodiment.

In S101, the UE may acquire a latency compensation parameter in the following two manners: manner 1, the UE receives a latency compensation parameter sent by the base station; manner 2: the UE acquires a latency compensation parameter according to a latency compensation method.

The latency compensation method includes at least one of: using a fixed latency compensation value, calculating a latency compensation value based on a timing advance (timing advance, TA for short), and calculating a latency compensation value based on an implementation of the UE. The latency compensation method may be pre-configured on the UE, or may be indicated to the UE by the base station.

In manner 2, the UE acquires a latency compensation parameter according to a latency compensation method as follows:

(1) When the latency compensation method is using a fixed latency compensation value, the UE determines the fixed latency compensation value as the latency compensation value. The fixed latency compensation value is pre-configured on the UE, or is sent to the UE when the base station indicates the latency compensation mode to the UE.

(2) When the latency compensation method is calculating a latency compensation value based on a TA, the UE acquires a valid TA, and calculates the latency compensation value according to the valid TA and a predefined algorithm.

The latency compensation value is, for example, $N_{TA}/2$, or $N_{TA}/2+\Delta$, where $N_{TA}$ is a valid TA, $\Delta$ may be a fixed value or the product of a fixed value and a coefficient, and the coefficient is related to the size of path loss.

The UE calculates the latency compensation value according to the valid TA and a predefined algorithm, which may be: the UE determines whether the current TA is valid according to the first information. If the current TA is valid, the UE determines that the current TA is the valid TA. If the current TA is invalid, the UE acquires the valid TA through the base station.

Exemplarily, the UE may acquire a valid TA from the base station in the following manners:

(1) The UE sends a random access preamble (preamble) to the base station, and the UE receives a random access response (random access response, RAR for short) sent by the base station, the random access response includes a valid TA.

When the UE is in an idle state or an RRC inactive state, the random access procedure may be triggered by the UE, the base station measures and obtains the valid TA according to the preamble sent by the UE, and sends the valid TA to the UE by carrying it in the RAR.

(2) The UE sends a first request message to the base station, where the first request message is used to request the base station to send a TA command (command), and the UE receives the TA command sent by the base station. The TA command includes a valid TA.

When the UE is in an RRC connected state, the UE requests the TA command from the base station and acquires the valid TA from the TA command.

(3) The UE receives a TA command sent by the base station, and the TA command includes a valid TA.

The difference between this manner and manner (2) is that in this manner, the base station actively sends a TA command to the UE, and the UE does not need to request a TA command from the base station. The UE acquires a valid TA from the TA command, and this manner is suitable for a UE in the RRC connected state.

(4) The UE receives a Physical Downlink Control Channel (Physical Downlink Control Channel, PDCCH for short) order (order) sent by the base station, the UE establishes a random access procedure according to the PDCCH order, and the UE receives the valid TA sent by the base station during the random access establishment procedure.

The method is suitable for a UE in the RRC connected state, when the network side has downlink data to send to the UE, but the uplink is out of synchronization, the base station sends a PDCCH order to the UE. The UE establishes a random access procedure according to the PDCCH order, and the UE acquires a valid TA during the random access procedure. The difference between this manner and manner (1) is that the random access procedure is triggered by the UE in manner (1), and the random access process is triggered by the network side in manner (4).

(5) The UE receives a paging (paging) command sent by the base station, the UE establishes a random access procedure according to the paging command, and the UE receives a valid TA sent by the base station during the random access establishment procedure.

This manner is suitable for a UE in an idle state or RRC inactive state. When the network side has downlink data to send to the UE, the base station sends the paging command to the UE. The UE establishes a random access procedure according to the paging command, and the UE acquires a valid TA during the random access procedure. The difference between this manner and manner (1) is that the random access procedure is triggered by the UE in manner (1), and the random access process is triggered by the network side in manner (5).

In the present embodiment, the UE determines whether the current TA is valid according to a first information. In an implementation, the first information may also be used to determine whether it is required to perform latency compensation.

Exemplarily, the first information includes at least one of the following information: the status of the UE, and the status of the UE includes: a radio resource control (Radio Resource Control, RRC for short) connected state, an idle (idle) state, or an RRC inactive (RRC inactive) state; whether the time alignment timer (timeAlignmentTimer) of the UE is on or running;

the service characteristic of the delay-sensitive communication TSC service currently running by the UE; a third information, used to indicate whether the UE has established or activated the TSC service; and latency compensation capability information of the UE.

For example, if the UE is out of synchronization in the uplink (that is, the uplink is out of synchronization) and there is no valid latency compensation value, the UE triggers a random access procedure, or the UE requests the base station to send a TA command.

Or, if the UE is out of synchronization in the uplink and there is no valid latency compensation value at time t1, the UE triggers a random access procedure at time t1, or the UE requests the base station to send a TA command.

Or, if the UE is out of synchronization in the uplink and there is no valid latency compensation value at time t1, the UE triggers a random access procedure at time t0, or the UE requests the base station to send a TA command, where t0 is earlier than t1.

Or, if the UE is out of synchronization in the uplink and there is no valid latency compensation value at time t1, then the base station actively sends a TA command to the UE at time t0, where t0 is earlier than t1.

For another example, if the UE is out of synchronization in the uplink and the TSC service is activated/arrival/transmitted, the UE triggers a random access procedure, and the UE requests the base station to send a TA command.

Or, if the UE is out of synchronization in the uplink and the TSC service is activated/arrival/transmitted at time t1, the UE triggers a random access procedure at time t1, or the UE requests the base station to send a TA command.

Or, if the UE is out of synchronization in the uplink and the TSC service is activated/arrival/transmitted at time t1, the UE triggers a random access procedure at time t0, or the UE requests the base station to send a TA command, where t0 is earlier than t1.

Specifically, if the UE is out of synchronization in the uplink and the TSC service is activated/arrival/transmitted at time t1, at time t0, the base station actively sends a TA command to the UE, where t0 is earlier than t1.

Exemplarily, when the UE does not have a valid TA, the UE determines that the uplink is out of synchronization.

In an implementation, the base station may also acquire a latency compensation parameter in the same manner as the UE, which is not described in detail in the present embodiment.

In an implementation, before step S101, step S100 is further included: the UE determines to perform latency compensation for the reference time information.

In the present embodiment, the UE determines to perform latency compensation for the reference time information according to at least one of the following information: a first latency compensation information sent by the base station, a predefined second latency compensation information, and latency compensation capability information of the UE.

In an implementation, the first latency compensation information is sent by the base station to the UE through a system information block (System Information Block, SIB for short) or an RRC message. The SIB message may be a SIB9 message or other SIB messages, which is not limited to the embodiment of the present application. In an implementation, the RRC message is a dedicated RRC (dedicated RRC) message. The dedicated RRC message may be a DLInformationTransfer message, or may be a new dedicated RRC message including synchronization information.

Wherein, the first latency compensation information includes at least one of the following information: a latency compensation parameter, a first indication information, effective time information of the latency compensation, a judgment condition for the UE to perform the latency compensation, a second indication information, a latency compensation manner, and a clock identifier of the TSN, wherein the first indication information indicates whether the UE is required to perform latency compensation for the reference time information, and the second indication information indicates whether the base station has performed latency compensation for the reference time information.

When the first latency compensation information includes a latency compensation parameter, the latency compensation parameter may be determined by the base station, or may be determined by the UE and reported to the base station.

When the first latency compensation information includes both the first indication information and the second indication information, the first indication information and the second indication information are carried by two different IEs or bits. When the value of the first IE or the first bit for carrying the first indication information is true, it indicates that the UE is required to perform latency compensation for the reference time information, and when the value of the first IE or the first bit is false, it indicates that the UE is not required to perform latency compensation for the reference time information.

When the value of the second IE or the second bit for carrying the second indication information is true, it indicates that the base station has performed latency compensation for the reference time information. When the value of the second IE or the second bit is false, it indicates that the base station does not perform latency compensation for the reference time information.

If the base station has performed latency compensation for the reference time information, the value of the second IE or the second bit is true, and the value of the first IE or the first bit is false, that is, the UE is not required to perform latency compensation for the reference time information. If the base station does not perform latency compensation for the reference time information, the value of the second IE or the second bit is false, and the value of the first IE or the first bit is true, and the UE is required perform latency compensation for the reference time information.

Correspondingly, after the UE receives the first latency compensation information, when the value of the second IE or the second bit is false, and the value of the first IE or the first bit is true, the UE determines that it needs to perform latency compensation for the reference time information. In other situations, the UE determines that it does not need to perform latency compensation for the reference time information.

The other situation includes: the value of the second IE or the second bit is true, and the value of the first IE or the first bit is false. Or, the value of the second IE or the second bit is true, and the value of the first IE or the first bit is true. Or, the value of the second IE or the second bit is false, and the value of the first IE or the first bit is false.

When the first latency compensation information includes only the first indication information and does not include the second indication information, after the UE receives the first indication information, if the first indication information indicates that the UE is required perform latency compensation for the reference time information, the UE determines to perform latency compensation for the reference time information. If the first indication information indicates that the UE is not required to perform latency compensation for the reference time information, the UE determines not to perform latency compensation for the reference time information.

When the first latency compensation information includes only the second indication information, and does not include the first indication information, after the UE receives the second indication information, if the second indication information indicates that the base station has performed latency compensation for the reference time information, the UE determines not to perform latency compensation for the reference time information, and if the second indication information indicates that the base station does not perform latency compensation for the reference time information, the UE determines to perform latency compensation for the reference time information.

In the present embodiment, when the UE determines to perform latency compensation for the reference time information according to the first indication information and/or the second indication information, the UE may perform latency compensation for the reference time information according to a latency compensation parameter included in the first latency compensation information or a latency compensation parameter obtained through calculation by the UE itself. If the first latency compensation information includes a latency compensation parameter, the latency compensation parameter is used to perform latency compensation for the reference time information. If the first latency compensation information does not include the latency compensation parameter, the UE may use a latency compensation manner included in the first latency compensation information or a latency compensation manner included in the second latency compensation information, to determine a latency compensation parameter, and then use the latency compensation parameter to perform latency compensation for the reference time information.

In an implementation, the latency compensation parameter may also be used by the UE to determine whether to perform latency compensation for the reference time information. For example, when the UE receives a latency compensation parameter, the UE determines to perform latency compensation for the reference time information, and performs latency compensation for the reference time information according to the latency compensation parameter. In the manner, the first latency compensation information does not need to include the first indication information and the second indication information.

When the first latency compensation information includes effective time information of the latency compensation, the UE may determine the start time and/or end time of the latency compensation according to the effective time of the latency compensation. The effective time information of the first latency compensation may include the start time at which the UE performs latency compensation and/or a duration for performing latency compensation. Correspondingly, when the UE performs latency compensation for the reference time information according to the latency compensation parameter, the UE performs latency compensation for the reference time information according to the effective time information of the latency compensation and the latency compensation parameter.

Specifically, at the start time of latency compensation, the UE performs latency compensation for the reference time information according to the latency compensation parameter, and at the end time of latency compensation, stops performing latency compensation for the reference time information. If the first latency compensation information does not include the effective time information of the latency compensation, the UE may always perform latency compensation for the reference time information, or the UE decides when to start perform latency compensation and when to end the delay compensation by itself.

In an implementation, the effective time information of the latency compensation may also be used for the UE to determine whether it is required to perform latency compensation for the reference time information. Exemplarily, if the first latency compensation information includes effective time information of latency compensation, the UE determines to perform latency compensation for the reference time information. In the manner, the first latency compensation information does not need to include the first indication information and the second indication information. After the UE determines to perform latency compensation for the reference time information according to the effective time information of the latency compensation, if the first latency compensation information includes a latency compensation parameter, then the UE uses the latency compensation parameter to perform latency compensation for the reference time information. If the first latency compensation information does not include a latency compensation parameter, the UE may determine a latency compensation parameter according to a latency compensation manner included in the first latency compensation information, and then use the latency compensation parameter to perform latency compensation for the reference time information.

When the first latency compensation information includes a judgment condition for the UE to perform latency compensation, the UE determines to perform latency compensation for the reference time information, which may be: the UE measures the measurement object according to the judgment condition and acquires a measurement result, and when the measurement result meets the judgment condition, the UE determines to perform latency compensation for the reference time information.

The measurement object may be configured by the network side, and the measurement object may be a channel status reference indicator signal (Channel Status Indicator Reference Signal, CSI-RS for short) and/or a synchronization signal block (Synchronization Signal Block, SSB for short).

Exemplarily, the measurement result includes at least one of the following parameters: reference signal received power (Reference Signal Received Power, RSRP for short), reference signal received quality (Reference Signal Received Quality, RSRQ for short), signal to interference plus noise ratio (Signal to Interference plus Noise Ratio, SINR for short), and Road loss.

Correspondingly, the judgment condition for the UE to perform latency compensation may include any one of the following conditions:
when the RSRP or RSRQ is less than or equal to a predefined first threshold or after a period of time or a certain number of times, the UE determines to perform latency compensation for the reference time information:
when the path loss is greater than or equal to a predefined second threshold or after a period of time or a certain number of times, the UE determines to perform latency compensation for the reference time information:
when the SINR is less than or equal to a predefined third threshold or after a period of time or a certain number of times, the UE determines to perform latency compensation for the reference time information:
when the RSRP or RSRQ is greater than or equal to the first threshold or after a period of time or a certain number of times, the UE determines not to perform latency compensation for the reference time information:
when the path loss is less than or equal to the second threshold or after a period of time or a certain number of times, the UE determines not to perform latency compensation for the reference time information: and
when the SINR is greater than or equal to the third threshold or after a period of time or a certain number of times, the UE determines not to perform latency compensation for the reference time information.

In an implementation, for each measurement object, the base station may configure two thresholds, one threshold is used for the judgment of performing latency compensation, and the other is used for the judgment of not performing latency compensation. Exemplarily, the network indicates TH1 and TH2, when the path loss is less than or equal to the TH1, the UE determines not to perform latency compensation for the reference time information, when the path loss is greater than the TH2, the UE determines to perform latency compensation for the reference time information.

In an implementation, the UE may also determine whether to perform latency compensation for the reference time information in combination with multiple measurement results, for example, when the RSRP or RSRQ is less than or equal to the predefined first threshold or after a period of time, and the path loss is greater than the second threshold for a period of time, the UE determines to perform latency compensation for the reference time information.

After the UE determines to perform latency compensation for the reference time information according to the judgment condition for performing latency compensation, if the first latency compensation information includes a latency compensation parameter, then the latency compensation parameter is used to perform latency compensation for the reference time information. If the first latency compensation information does not include the latency compensation parameter, the UE may determine the latency compensation parameter according to the latency compensation manner included in the first latency compensation information, and then use the latency compensation parameter to perform latency compensation for the reference time information. If the first latency compensation information also includes the effective time information of the latency compensation, the UE may perform latency compensation for the reference time information according to the effective time information of the latency compensation.

In an implementation, the UE may also combine the judgment condition for performing latency compensation with other information to determine whether it is required to perform latency compensation for the reference time information. For example, the UE first determines whether it is required to perform latency compensation for the reference time information according to the first indication information and/or the second indication information, and if determines it is required to perform latency compensation for the reference time information, then it is further judged whether it satisfies the judgment condition of performing latency compensation itself, and when the judgment condition is satisfied, the UE determines to perform latency compensation for the reference time information.

The latency compensation manner includes at least one of the following manners: using a fixed latency compensation value, calculating a latency compensation value based on a TA, or calculating a latency compensation value based on an implementation of the UE. If the first latency compensation information includes only one latency compensation manner, the UE determines the latency compensation parameter according to the latency compensation manner. If the first latency compensation information includes multiple latency compensation manners, when the UE determines the latency compensation parameter according to the latency compensation manner, it first chooses a latency compensation manner from the multiple latency compensation manners.

When the first latency compensation information includes a latency compensation parameter, the first latency compensation information may not carry a latency compensation manner.

When the first latency compensation information includes a latency compensation parameter, a latency compensation manner can also be carried to notify the UE that the base station uses the latency compensation manner to acquire the latency compensation parameter.

In an implementation, the latency compensation manner may also be used for the UE to determine whether to perform latency compensation for the reference time information by itself. For example, when the first latency compensation information includes a latency compensation manner indication, the UE determines to perform latency compensation for the reference time information by itself.

A TSN clock (TSN clock) identifier can be used to indicate which TSN clock the UE performs latency compensation for, if the UE communicates with multiple TSNs, some TSN clocks may not require latency compensation, and some TSN clocks require latency compensation. Therefore, the TSN clock identifier needs to be used to indicate which TSN clock the UE performs latency compensation for. In an implementation, it can also be used by the UE to determine whether to perform latency compensation for the reference time information by itself, if the first latency compensation information includes the TSN clock identifier, the UE determines to perform latency compensation for the reference time information by itself.

In an implementation, the first latency compensation information may further include other information, for example, it may also include a TSN clock number.

In the present embodiment, a second latency compensation information is information specified in the agreement, and the second latency compensation information may be completely or partially the same as the first latency compensation information. For example, the second latency compensation information includes at least one of the following information: a latency compensation parameter, a third indication information, effective time information of the latency compensation, a judgment condition for the UE to perform the latency compensation, a latency compensation manner, and a TSN clock identifier, and the third indication information is used to indicate that the base station or the UE performs latency compensation for the reference time information. At this time, the base station does not need to send the first latency compensation information to the UE, and the UE can determine to perform latency compensation for the reference time information according to the second latency compensation information, the specific determination manner refers to the description of each parameter in the first latency compensation information.

The UE may also combine the first latency compensation information and the second latency compensation information to perform latency compensation for the reference time information.

For example, the first latency compensation information includes first indication information and/or second indication information, and the second latency compensation information includes a latency compensation parameter or a latency compensation manner, then the UE determines to perform compensation for the reference time information by itself according to the first indication information and/or the second indication information, and performs latency compensation for the reference time information according to the latency compensation parameter included in the second latency compensation information, or, the UE determines the latency compensation parameter according to the latency compensation method included in the second latency compensation information, and performs latency compensation for the reference time information by using the determined latency compensation parameter.

Alternatively, the second latency compensation information includes a third indication information, and the third indication information is used to indicate that the UE performs latency compensation for the reference time information, and the first latency compensation information includes the latency compensation parameter or the latency compensation manner. After determining to perform latency compensation by itself according to the third indication information, the UE performs latency compensation for the reference time information according to the latency compensation parameter included in the reference time information, or, determines the latency compensation parameter according to the latency compensation method included in the first latency compensation information, and performs latency compensation for the reference time information by using the determined latency compensation parameter.

Alternatively, the UE determines whether to perform latency compensation for the reference time information according to the third indication information included in the second latency compensation information and the judgment condition for the UE to perform latency compensation included in the first latency compensation information.

The latency compensation capability information of UE is used to indicate whether the UE has the latency compensation capability. If the UE has the latency compensation capability, the UE determines to perform latency compensation for the reference time information by itself.

The UE may also combine the latency compensation capability information of UE and the first latency compensation information to determine whether to perform latency compensation for the reference time information, for example, the UE first learns that it needs to perform latency compensation for the reference time information according to the first indication information, the second indication information or the latency compensation parameter or the effective time information of the latency compensation in the first latency compensation information, then the UE determines whether it has the latency compensation capability according to the latency compensation capability information, if the latency compensation capability information indicates that the UE has the latency compensation capability, the UE determines to perform latency compensation for the reference time information. If the latency compensation capability information indicates that the UE does not have the latency compensation capability, the UE determines not to perform latency compensation for the reference time information.

Similarly, the UE may also combine the latency compensation capability information of UE and the second latency compensation information to determine whether to perform latency compensation for the reference time information, for example, the UE first learns that it needs to perform latency compensation for the reference time information according to the third indication information, or the latency compensation parameter or the effective time information of the latency compensation in the second latency compensation information, then the UE determines whether it has the latency compensation capability according to the latency compensation information capability, if the latency compensation capability information indicates that the UE has the latency compensation capability, the UE determines to perform latency compensation for the reference time information. If the latency compensation capability information indicates that the UE does not have the latency compensation capability, the UE determines not to perform latency compensation for the reference time information.

In an implementation, the UE may also report its latency compensation capability information to the base station.

It can be understood that before step S102, the UE determines the synchronization time information that needs to be compensated. For example, the UE determines that it needs to perform latency compensation for the reference time, or, the UE determines that it needs to perform latency compensation for the reference frame corresponding to the reference SFN. The reference time and reference SFN may be sent by the base station to the UE through an RRC message or a broadcast message.

Different from the prior art, in the embodiment of the present application, the reference time includes at least one of the following time information: days (refDays), seconds (refSeconds), milliseconds (refMilliSeconds), microseconds (refQuarterMicroSeconds), ten nanoseconds (ref10NaroSeconds) and nanoseconds (ref50NaroSeconds).

Exemplarily, the base station can carry the reference time through the following two IEs:

| Manner 1 | |
|---|---|
| ReferenceTime-r15 ::= | SEQUENCE { |
| refDays-r15 | INTEGER (0..72999), |
| refSeconds-r15 | INTEGER (0..86399), |
| refMilliSeconds-r15 | INTEGER (0..999), |
| refMicroSeconds-r16 | INTEGER (0..999) |
| ref10NaroSeconds-r16 | INTEGER (0..99) |
| Manner 2 | |
| ReferenceTime-r15 ::= | SEQUENCE { |
| refDays-r15 | INTEGER (0..72999), |
| refSeconds-r15 | INTEGER (0..86399), |

-continued

| refMilliSeconds-r15 | INTEGER (0..999), |
|---|---|
| ref10NaroSeconds-r16 | INTEGER (0..99999) |

Manner 1, compared with the prior art, adds the granularity time of refMicroSeconds and ref10NaroSeconds. Compared with the prior art, Manner 2 adds the granularity time of ref10NaroSeconds. Adding the refMicroSeconds and/or ref10NaroSeconds time is equivalent to increasing the time synchronization accuracy.

In the prior art, after acquiring the reference time and the reference SFN, the UE learns that the SFN is the $m^{th}$ frame according to the reference SFN, and learns according to the reference time that the SFN is at X o'clock X minute X second, so that the UE knows the time of the $m$th frame is at X o'clock X minute X second, and the time synchronization is completed.

In the embodiment of the present application, after performing latency compensation for the reference time information, which is equivalent to offsetting the reference time information by an X, exemplarily, when the latency compensation parameter is a latency compensation value, the UE increases or decreases the latency compensation value based on the reference time information.

Take Manner 2 as an example, the value of the current reference time is that Y=refDays*86400*1000*100000+refSeconds*1000*100000+refMilliSeconds*100000+ref10NaroSeconds, then the UE performs an offset of X or X/2 on the basis of Y, such as Y+X or Y+X/2, therefore, the final reference time is Y+X or Y+X/2, and the X is the latency compensation value.

In the present embodiment, the UE acquires a latency compensation parameter, and performs latency compensation for the reference time information according to the latency compensation parameter. By performing latency compensation for the reference time information, the error of the reference time information due to the propagation delay between the base station and the UE can be compensated, so that the reference time information is more accurate, and the time synchronization accuracy, which the UE subsequently performs time synchronization by using the reference time information after latency compensation to obtain, is improved.

Embodiment 2

Figure 5:
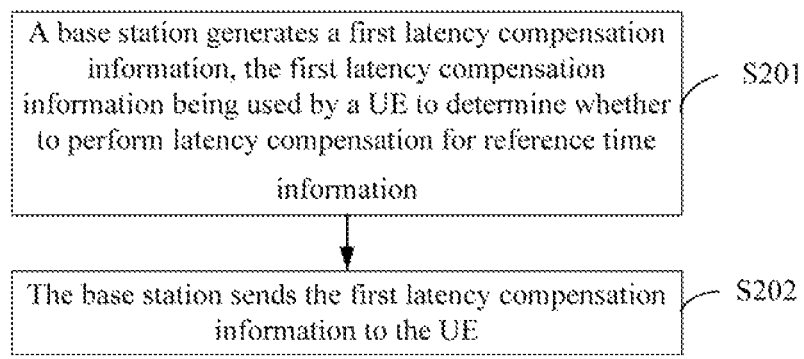
FIG. 5 is a flowchart of a latency compensation method provided by Embodiment 2 of the present disclosure.

FIG. 5 is a flowchart of a latency compensation method provided by Embodiment 2 of the present disclosure, as shown in FIG. 5, the method provided by this embodiment includes the following steps:

S201. A base station generates a first latency compensation information, the first latency compensation information being used by a UE to determine whether to perform latency compensation for reference time information.

Exemplarily, the first latency compensation information includes at least one of the following information: a first indication information, effective time information of the latency compensation, a judgment condition for the UE to perform the latency compensation, a second indication information, a latency compensation manner, and a TSN clock identifier, wherein the first indication information indicates whether the UE is required to perform latency compensation, and the second indication information indicates whether the base station has performed latency compensation for the reference time information.

In an implementation, the first latency compensation information further includes the number of TSN clocks.

For the meaning and value of each information in the first latency compensation information, refer to the related description in Embodiment 1, and will not be repeated here.

S202. The base station sends the first latency compensation information to the UE.

The base station may send multiple pieces of information in the first latency compensation information to the UE through one or more messages. For example, the base station may send the first latency compensation information to the UE through a SIB message or an RRC message, the SIB message may be a SIB9 message, and the RRC message may be a dedicated RRC message.

After receiving the first latency compensation information, the UE may perform latency compensation according to the first latency compensation information, or may not perform latency compensation. If the UE determines to perform latency compensation according to the first latency compensation information, then refer to the determination manner and the specific compensation manner in Embodiment 1.

After receiving the first latency compensation information, the UE can also calculate the latency compensation parameter according to the latency compensation manner in the first latency compensation information, and send the delay compensation parameter to the base station. Correspondingly, the base station receives the latency compensation parameter sent by the UE, and performs latency compensation for the reference time information according to the latency compensation parameter, and sends the reference time information after latency compensation to the UE.

The base station performs latency compensation for the reference time information, which can be: the base station increases or decreases the latency compensation parameter on the basis of the reference time information, or, multiplies the reference time information by the latency compensation parameter, to increase or decrease the reference time information. The reference time information includes: reference time and/or reference frame. Wherein, the reference time includes at least one of the following time information: days, seconds, milliseconds, microseconds, ten nanoseconds and nanoseconds.

Wherein, the compensation of the base station for the reference time information is the same as the compensation of the UE for the reference time information, refer to the related description of Embodiment 1, which will not be repeated here.

In the present embodiment, the base station generates a first latency compensation information, and sends the first latency compensation information to the UE, and the first latency compensation information is used by the UE to determine whether to perform latency compensation for the reference time information. The base station triggers the base station or the UE to perform latency compensation for the reference time information through the first latency compensation information, and the time synchronization accuracy is improved by compensating for the reference time information.

Embodiment 3

Figure 6:
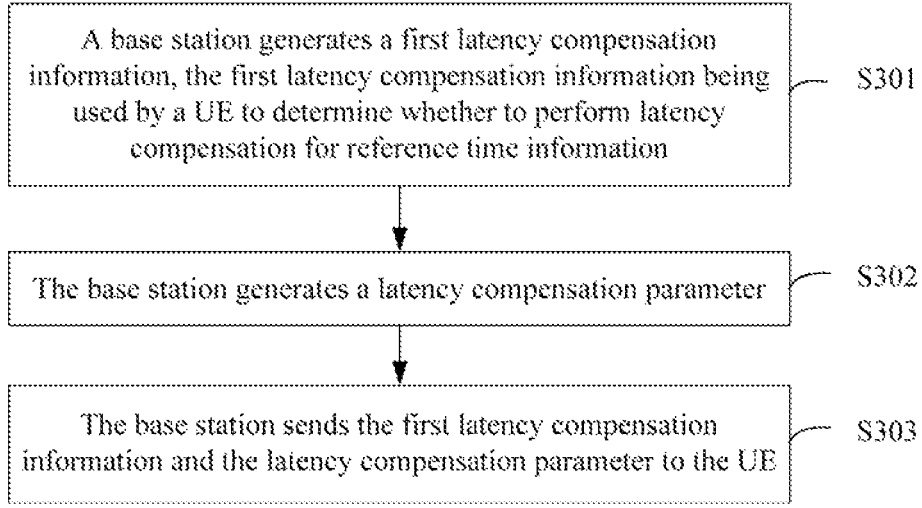
FIG. 6 is a flowchart of a latency compensation method provided by Embodiment 3 of the present disclosure.

FIG. 6 is a flowchart of a latency compensation method provided by Embodiment 3 of the present disclosure, as shown in FIG. 6, the method provided by this embodiment includes the following steps:

S301. A base station generates a first latency compensation information, the first latency compensation information being used by a UE to determine whether to perform latency compensation for reference time information.

Exemplarily, the first latency compensation information includes at least one of the following information: a first indication information, effective time information of the latency compensation, a judgment condition for the UE to perform the latency compensation, a second indication information, a latency compensation manner, and a TSN clock identifier, wherein the first indication information indicates whether the UE is required to perform latency compensation, and the second indication information indicates whether the base station has performed latency compensation for the reference time information.

In an implementation, the first latency compensation information further includes the number of TSN clocks.

For the meaning and value of each information in the first latency compensation information, refer to the related description in Embodiment 1, and will not be repeated here.

S302. The base station generates a latency compensation parameter.

The base station can generate a latency compensation parameter according to the latency compensation manner. In an implementation, before generating the latency compensation parameter according to the latency compensation manner, the base station first determines the latency compensation manner.

The latency compensation manner can be issued by a high-level network, or it can be stipulated by a protocol. The latency compensation manner includes at least one of the following manners: using a fixed latency compensation value, calculating a latency compensation value based on TA, calculating a latency compensation value based on an implementation of the UE or calculating a latency compensation value based on an implementation of the base station.

If the high-level network or protocol specifies a variety of latency compensation manners, the base station can choose a latency compensation manner from a variety of latency compensation manners.

After the base station determines the latency compensation manner, the latency compensation parameter can be generated in the following ways:

(1) Determining, by the base station, a fixed latency compensation value as the latency compensation parameter, when the latency compensation manner is using the fixed latency compensation value.

(2) Acquiring, by the base station, a valid TA, when the latency compensation manner is calculating a latency compensation value based on TA; and calculating, the latency compensation value based on the valid TA and a predefined algorithm.

Exemplarily, the base station acquires the valid TA, which may be: the base station determines whether the current TA is valid according to first information. If the current TA is valid, the base station determines that the current TA is the valid TA. If the current TA is invalid, the base station acquires the valid TA by measurement.

Wherein, the first information includes one or more of the following information: state of the UE, the state of the UE includes: an RRC connected state, an idle state or an RRC inactive state; whether the time calibration timer of the UE is on or running; a service characteristic of a TSC service currently running by the UE; third information, to represent or indicate whether the UE has established or activated a TSC service; and the latency compensation capability information of the UE. In an implementation, the first information may also be used to determine whether it is required to perform latency compensation.

In an implementation, the base station acquires the valid TA by measurement in the following manners:
  sending, by the base station, a PDCCH command to the UE, where the base station measures the valid TA during the random access establishment procedure, and the random access establishment procedure is triggered by the UE according to the PDCCH command.
  sending, by the base station, a paging command to the UE, where the base station measures the valid TA during the random access establishment procedure, and the random access establishment procedure is triggered by the UE according to the paging command.
  (3) Measuring, by the base station, the valid TA according to the uplink channel or random access preamble sent by the UE.

The specific implementation manner of calculating the latency compensation parameter by the base station is the same as the UE. Refer to the description of the foregoing Embodiment 1, which will not be repeated here.

S303. The base station sends the first latency compensation information and the latency compensation parameter to the UE.

The base station may send the first latency compensation information and the latency compensation parameter to the UE in one message, or may also send to the UE in different messages.

In the present embodiment, the base station generates the first latency compensation information and the latency compensation parameter, and sends the first latency compensation information and the latency compensation parameter to the UE. The first latency compensation information is used by the UE to determine whether to perform latency compensation for the reference time information, the latency compensation parameter is used to perform latency compensation for the reference time information. The base station triggers the base station or the UE to perform latency compensation for the reference time information through the first latency compensation information, and the time synchronization accuracy is improved by performing compensation for the reference time information.

Embodiment 4

Figure 7:
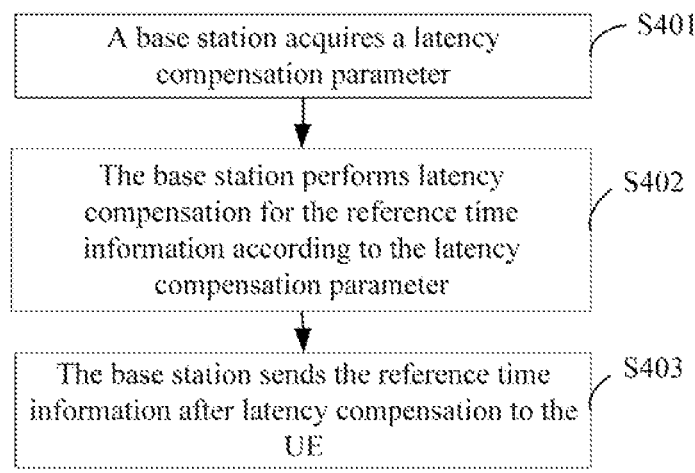
FIG. 7 is a flowchart of a latency compensation method provided by Embodiment 4 of the present disclosure.

FIG. 7 is a flowchart of a latency compensation method provided by Embodiment 4 of the present disclosure, as shown in FIG. 7, the method provided by this embodiment includes the following steps:

S401. A base station acquires a latency compensation parameter.

In one manner, the base station receives the latency compensation parameter sent by the UE, the latency compensation parameter is generated by the UE, and the specific manner that the UE generates the latency compensation parameter is described in Embodiment 1, which will not be repeated here.

In another manner, the base station generates the latency compensation parameter according to the latency compensation manner.

The method in which the base station generates the latency compensation parameter refers to the description of Embodiment 2, which will not be repeated here.

S402. The base station performs latency compensation for the reference time information according to the latency compensation parameter.

Exemplarily, the base station increases or decreases the latency compensation parameter on the basis of the reference time information, or, the reference time information is multiplied by the latency compensation parameter, to increase or decrease the reference time information. The reference time information includes: reference time and/or reference frame. Wherein, the reference time includes at least one of the following time information: days, seconds, milliseconds, microseconds, ten nanoseconds and nanoseconds.

Wherein, the compensation of the base station for the reference time information is the same as the compensation of the UE for the reference time information, refer to the related description of Embodiment 1, which will not be repeated here.

S403. The base station sends the reference time information after latency compensation to the UE.

In the present embodiment, the base station acquires a latency compensation parameter, and performs latency compensation for the reference time information according to the latency compensation parameter, and sends the reference time information after latency compensation to the UE. By performing latency compensation for the reference time information, the error of the reference time information due to the propagation delay between the base station and the UE can be compensated, so that the reference time information is more accurate, and the time synchronization accuracy, which the UE subsequently performs time synchronization by using the reference time information after latency compensation to obtain, is improved.

Embodiment 5

In the solutions of Embodiment 1 to Embodiment 4, the UE or the base station calculates the latency compensation value based on the TA. In order to improve the time synchronization accuracy, the TA accuracy may be improved. For example, the TA adjustment accuracy is modified to ½ of the existing accuracy, such as, modifying the accuracy from ±256 Tc to ±128 Tc, the Tc is the minimum time unit of the physical layer, and the Tc can be obtained by looking up the table, and the modified TA adjustment accuracy can be also called enhanced TA adjustment accuracy.

Exemplarily, the enhanced TA adjustment accuracy can be stored in the base station in the form of a table in a predefined manner, Table 1 is a schematic diagram of the enhanced TA adjustment accuracy, and Table 1 is as follows:

TABLE 1

| Sub Carrier Spacing (kHz) | 15 | 30 | 60 | 120 |
|---|---|---|---|---|
| TA adjustment accuracy of UE | ±128 Tc | ±128 Tc | ±64 Tc | ±16 Tc |

It can be seen from Table 1 that different sub carrier spacings (Sub Carrier Spacing, SCS for short) correspond to different TA adjustment accuracies. As the sub carrier spacing increases, the TA adjustment accuracy gradually decreases.

It should be noted that the enhanced TA adjustment accuracy can be used in combination with the solutions of Embodiment 1 to Embodiment 3, or can be used alone, that is, the existing TA adjustment accuracy is modified to the enhanced TA adjustment accuracy provided by the present embodiment.

Embodiment 6

The UE may report the latency compensation capability to the base station, and for the UE that meets the latency compensation capability, the base station may send an enhanced TA command MAC CE and/or an enhanced random access response to the UE.

The enhanced TA command can be distinguished from the existing TA command through a new logical channel identify (Logical Channel Identify, LCID for short), that is, the LCID of the enhanced TA command has a different value from the LCID of the existing TA command.

The enhanced TA command can also be distinguished from the existing TA command through a new MAC CE format, for example, the number of bits occupied by the enhanced TA command is greater than 6.

Figure 8:
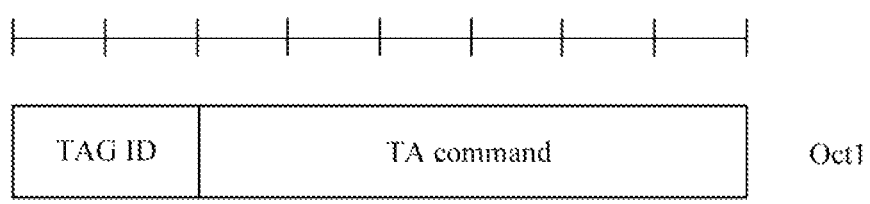
FIG. 8 is a schematic diagram of a format of a MAC CE of an existing TA command.
Figure 9:
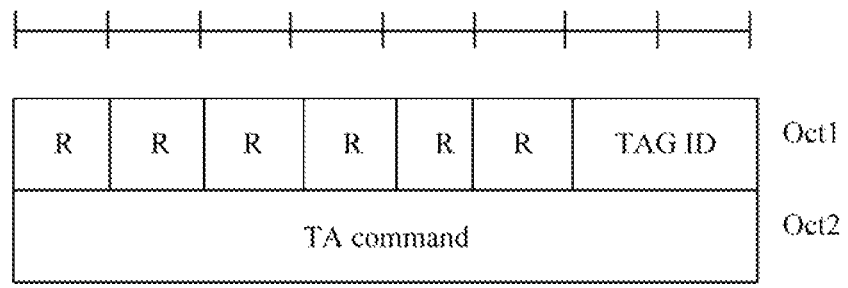
FIG. 9 is a schematic diagram of a format of a MAC CE of an enhanced TA command.

FIG. 8 is a schematic diagram of a format of a MAC CE of an existing TA command, and FIG. 9 is a schematic diagram of a format of a MAC CE of an enhanced TA command. Comparing FIG. 8 and FIG. 9, it can be seen that the MAC CE of the existing TA command only occupies 1 byte (octet), and the existing TA command only occupies 6 bits, and the enhanced TA command occupies 8 bits or the enhanced TA command MAC CE expands to 2 bytes. As shown in FIG. 9, the position of the bits occupied by the enhanced TA command has changed, the existing TA command and TAG ID (tag ID) jointly occupy an octet, and the enhanced TA command occupies a separate octet, the TAG ID and the extended 6 reserved bits Rs occupy one octet.

The number of bits occupied by the valid TA command in the format of the enhanced random access response is greater than 12, and the number of bits occupied by the valid TA command in the existing random access response format is equal to 12. The enhanced random access response is used to transmit the extended TA command. In an implementation, the valid TA command in the enhanced random access response occupies reserved bits in the existing random access response.

Figure 10:
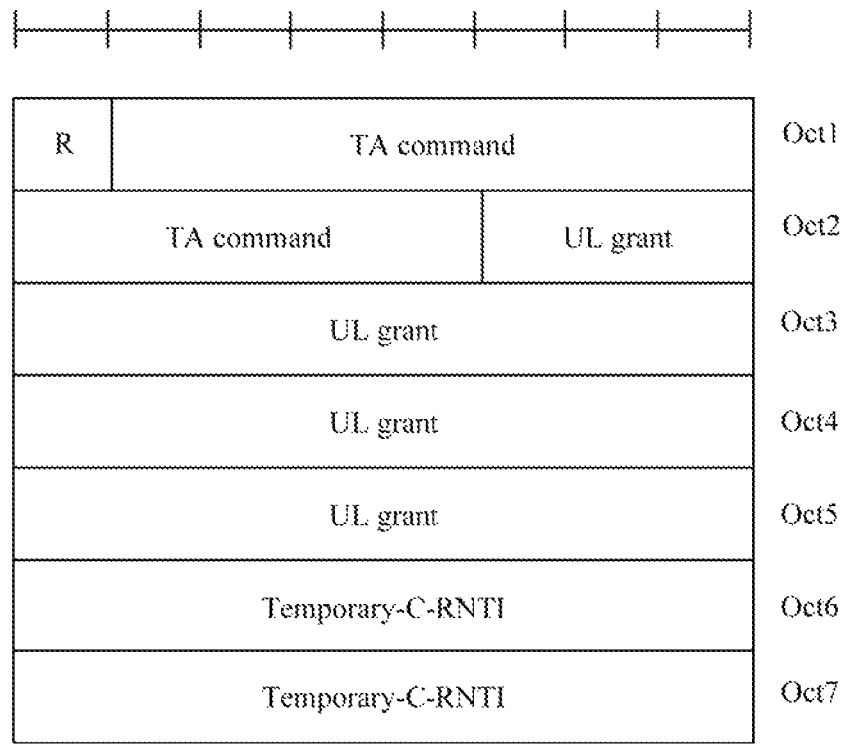
FIG. 10 is a schematic diagram of a format of an existing random access response.
Figure 11:
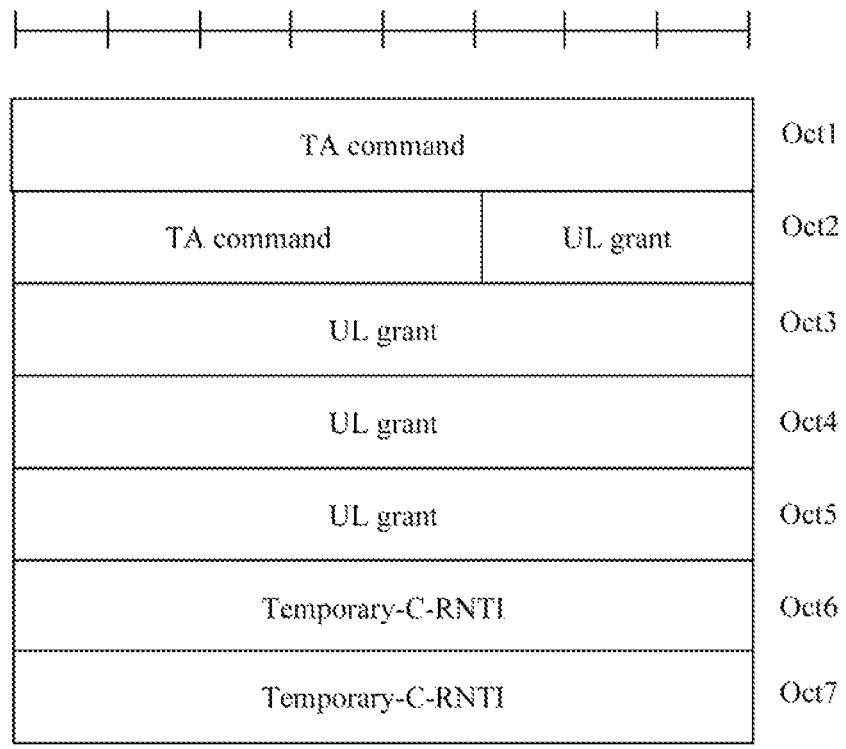
FIG. 11 is a schematic diagram of a format of an enhanced random access response.

FIG. 10 is a schematic diagram of a format of an existing random access response, and FIG. 11 is a schematic diagram of a format of an enhanced random access response. As shown in FIG. 10, the existing random access response occupies a total of 56 bits, and the total of 56 bits is 7 octets, among them, a reserved bit R occupies the first bit of oct1, a TA command occupies the second bit of oct1 to the fifth bit of oct2, and the TA command occupies a total of 12 bits, and an uplink grant (UL Grant) occupies the last three bits of oct2 and all bits of oct3-oct5, and a temporary-Cell Radio Network Temporary Identifier (C-RNTI) occupies oct6 and oct7.

Comparing FIG. 10 and FIG. 11, the number of bits occupied by the TA command in the format of the existing random access response is equal to 12, and the number of bits occupied by the valid TA command in the enhanced random access response is 13 bits, that is, the TA command occupies the reserved bit R in the existing random access response.

The base station may send an enhanced TA command and an existing TA command to the UE. Similarly, the base station may send an enhanced random access response and an existing random access response to the UE. For a UE with latency compensation capability, in an implementation, the UE may only detect the enhanced TA command and/or the enhanced random access response, and not detect the existing random access response and/or existing TA command.

In an implementation, the UE may only detect the enhanced. TA command and/or the enhanced random access response, after sending the latency compensation capability supported by the UE to the base station. If the UE does not send the latency compensation capability supported by the UE to the base station, the UE needs to detect: the existing random access response, the existing TA command, the enhanced TA command, and the enhanced random access response.

Or, after the base station receives the latency compensation capability supported and reported by the UE, the base station instructs the UE to use the corresponding detection manner of the enhanced TA command and/or the enhanced random access response, and the UE only detects enhanced TA command and/or enhanced random access response according to the instruction of the base station. If the UE does not receive the instruction sent by the base station after reporting the latency compensation capability supported by the UE, the UE needs to detect: the existing random access response, the existing TA command, the enhanced TA command and the enhanced random access response.

Alternatively, the base station actively instructs the UE to adopt the corresponding detection manner of the enhanced TA command and/or enhanced random access response, and the UE detects only the enhanced TA command and/or enhanced random access response according to the instruction of the base station.

Figure 12:
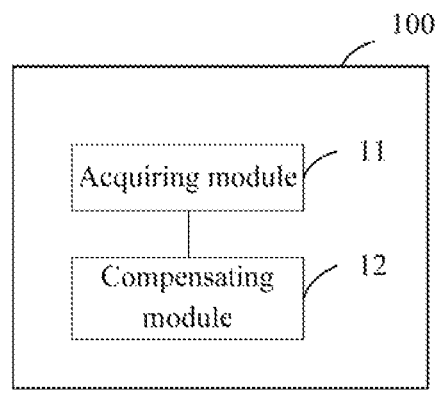
FIG. 12 is a schematic structural diagram of a UE provided in Embodiment 7 of the present application.

FIG. 12 is a schematic structural diagram of a UE provided in Embodiment 7 of the present application, as shown in FIG. 12, the UE 100 includes:
an acquiring module 11, configured to acquire a latency compensation parameter; and
a compensating module 12, configured to perform latency compensation for reference time information according to the latency compensation parameter.

In an implementation, the reference time information is used for time synchronization of the UE with a base station.

In an implementation, it further includes: a synchronizing module, configured to perform time synchronization with the base station according to the reference time information after latency compensation.

In an implementation, it further includes: a determining module, configured to determine to perform latency compensation for the reference time information.

In an implementation, the determining module is specifically configured to determine to perform latency compensation for the reference time information according to at least one of the following information:
a first latency compensation information sent by the base station, a predefined second latency compensation information, and latency compensation capability information of the UE.

In an implementation, it further includes: a receiving module, configured to receive the first latency compensation information sent by the base station through system information block SIB or radio resource control RRC message.

In an implementation, the first latency compensation information includes at least one of the following information: latency compensation parameter, a first indication information, effective time information of the latency compensation, a judgment condition for the UE to perform the latency compensation, a second indication information, a latency compensation manner, and a clock identifier of the time sensitive network (TSN), wherein the first indication information is used to represent whether the UE is required to perform latency compensation for the reference time information, and the second indication information is used to represent whether the base station has performed latency compensation for the reference time information.

In an implementation, when the first latency compensation information includes a judgment condition for the UE to perform latency compensation, the determining module is specifically configured to measure a measurement object according to the judgment condition and acquire a measurement result, and the measurement result includes at least one of the following parameters: reference signal received power (RSRP), reference signal received quality (RSRQ), signal to interference plus noise ratio (SINK), Road loss; and determine to perform latency compensation for the reference time information, when the measurement result meets the judgment condition.

In an implementation, the latency compensation method includes at least one of the following manners: using a fixed latency compensation value, calculating a latency compensation value based on a timing advance (TA) or calculating a latency compensation value based on an implementation of the UE.

In an implementation, the acquiring module 11 is specifically configured to receive the latency compensation parameter sent by a base station.

In an implementation, the acquiring module 11 is specifically configured to acquire the latency compensation parameter according to the latency compensation manner indicated by the base station.

In an implementation, the acquiring module 11 is specifically configured to determine the fixed latency compensation value as the latency compensation parameter, when the latency compensation manner is using a fixed latency compensation value.

In an implementation, the acquiring module 11 is specifically configured to acquire a valid TA, when the latency compensation manner is to calculate the latency compensation value based on TA; and calculate the latency compensation value according to the valid TA and a predefined algorithm.

In an implementation, the acquiring module 11 is specifically configured to determine a current TA as the valid TA when the current TA is valid; and acquire the valid TA through the base station when the current TA is invalid.

In an implementation, the acquiring module 11 is further configured to:
determine whether the current TA is valid or not according to a first information; where the first information includes at least one of the following information:
state of the UE, the state of the UE including: a radio resource control RRC connected state, an idle state or an RRC inactive state;
whether a time calibration timer of the UE is on or running;
a service characteristic of a latency-sensitive communication TSC service currently running by the UE;
a third information, used to indicate whether the UE has established or activated the TSC service; and
the latency compensation capability information of the UE.

In an implementation, the acquiring module 11 is specifically configured to send a random access preamble to the base station; and receive a random access response sent by the base station, and the random access response includes the valid TA.

In an implementation, the acquiring module 11 is specifically configured to send a first request message to the base station, and the first request message is used to request the base station to send a TA command; and receive the TA command sent by the base station, and the TA command includes the valid TA.

In an implementation, the acquiring module 11 is specifically configured to receive the TA command sent by the base station, and the TA command includes the valid TA.

In an implementation, the acquiring module 11 is specifically configured to receive a physical downlink control channel (PDCCH) command or a paging command sent by the base station; establish a random access procedure according to the PDCCH command or paging command, and receive the valid TA sent by the base station in the random access establishment procedure.

In an implementation, the compensating module 12 is specifically configured to increase or decrease the latency compensation parameter on the basis of the reference time information.

In an implementation, the reference time information includes: a reference time and/or a reference frame.

In an implementation, the reference time includes at least one of the following time information: days, seconds, milliseconds, microseconds, ten nanoseconds and nanoseconds.

In an implementation, the number of bits occupied by the valid TA in the format of the random access response is greater than 12.

In an implementation, the valid TA occupies reserved bits.

In an implementation, the number of bits occupied by the TA command is greater than 6.

In an implementation, the acquiring module is specifically configured to detect only in accordance with the format of the random access response.

In an implementation, the acquiring module is specifically configured to detect only in accordance with the format of the TA command.

The UE provided in any implementation manner of the present embodiment is configured to implement the technical solution implemented by the UE in any one of the foregoing method embodiments, and their implementation principles and technical effects are similar, and will not be repeated here.

Figure 13:
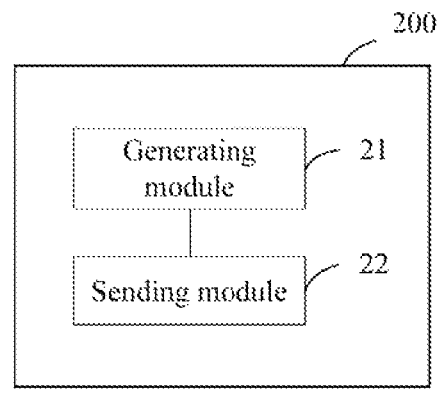
FIG. 13 is a schematic structural diagram of a base station provided in Embodiment 8 of the present application.

FIG. 13 is a schematic structural diagram of a base station provided in Embodiment 8 of the present application, as shown in FIG. 13, the base station 200 includes:
P a generating module 21, configured to generate a first latency compensation information, the first latency compensation information being used by a user equipment (UE) to determine whether to perform latency compensation for the reference time information: and
a sending module 22, configured to send the first latency compensation information to the UE.

In an implementation, the first latency compensation information includes at least one of the following information: a first indication information, effective time information of the latency compensation, a judgment condition for the UE to perform the latency compensation, a second indication information, a latency compensation method, and a clock identifier of the time sensitive network (TSN), wherein the first indication information is used to represent whether the UE is required to perform latency compensation, and the second indication information is used to represent whether the base station has performed latency compensation for the reference time information.

In an implementation, the sending module 22 is further configured to send a latency compensation parameter to the UE. Correspondingly, the generating module 21 is further configured to generate the latency compensation parameter according to latency compensation manner.

In an implementation, it further includes a determining module, configured to determine the latency compensation manner.

In an implementation, it further includes:
a receiving module, configured to receive the latency compensation parameter sent by the UE;
a compensating module, configured to perform latency compensation for the reference time information according to the latency compensation parameter; and
the sending module is further configured to send the reference time information after latency compensation to the UE.

In an implementation, the latency compensation method includes at least one of the following manners: using a fixed latency compensation value, calculating a latency compensation value based on a timing advance (TA), calculating a latency compensation value based on an implementation of the UE or calculating a latency compensation value based on an implementation of the base station.

In an implementation, the generating module 21 is specifically configured to determine the fixed latency compensation value as the latency compensation parameter, when the latency compensation manner is using the fixed latency compensation value.

In an implementation, the generating module 21 includes:
an acquiring sub-module, configured to acquire a valid TA when the latency compensation manner is calculating the latency compensation value based on the TA; and
a calculating sub-module, configured to calculate the latency compensation value based on the valid TA and a predefined algorithm.

In an implementation, the acquiring sub-module is specifically configured to determine a current TA as the valid TA when the current TA is valid; acquire the valid TA by measurement when the current TA is invalid.

In an implementation, the acquiring sub-module is further configured to:
determine whether the current TA is valid or not according to a first information; and
where the first information includes at least one of the following information:
state of the UE, the state of the UE including: a radio resource control RRC connected state, an idle state or an RRC inactive state;
whether a time calibration timer of the UE is on or running;
a service characteristic of a latency-sensitive communication TSC service currently running by the UE;
a third information, used to indicate whether the UE has established or activated the TSC service; and
latency compensation capability information of the UE.

In an implementation, the acquiring sub-module is specifically configured to send a physical downlink control channel (PDCCH) command or a paging command to the UE; and measure the valid TA during a random access establishment procedure, where the random access establishment procedure is triggered by the UE according to the PDCCH command or the paging command.

In an implementation, the acquiring sub-module is specifically configured to measure the valid TA according to an uplink channel or a random access preamble sent by the UE.

In an implementation, the compensating module is specifically configured to increase or decrease the latency compensation parameter on the basis of the reference time information.

In an implementation, the reference time information includes: a reference time and/or a reference frame.

In an implementation, the reference time includes at least one of the following time information:
days, seconds, milliseconds, microseconds, ten nanoseconds and nanoseconds.

The base station provided in any implementation manner of the present embodiment is configured to implement the technical solution implemented by the base station in the second method embodiment described above, and their implementation principles and technical effects are similar, and will not be repeated here.

Figure 14:
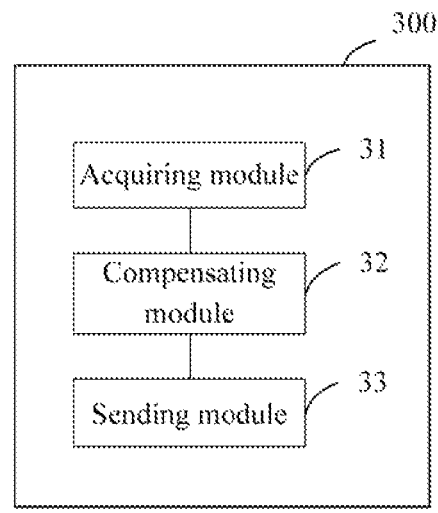
FIG. 14 is a schematic structural diagram of a base station provided in Embodiment 9 of the present application.

FIG. 14 is a schematic structural diagram of a base station provided in Embodiment 9 of the present application, as shown in FIG. 14, the base station 300 includes:
an acquiring module 31, configured to acquire a latency compensation parameter;
a compensating module 32, configured to perform latency compensation for reference time information according to the latency compensation parameter; and
a sending module 33, configured to send the reference time information after latency compensation to a user equipment (UE).

In an implementation, the acquiring module 31 is specifically configured to receive the latency compensation parameter sent by the UE.

In an implementation, the acquiring module 31 is specifically configured to generate the latency compensation parameter according to a latency compensation manner.

In an implementation, the latency compensation method includes at least one of the following manners: using a fixed latency compensation value, calculating a latency compensation value based on a timing advance (TA), calculating a latency compensation value based on an implementation of the UE or calculating a latency compensation value based on an implementation of the base station.

In an implementation, the acquiring module 31 is specifically configured to determine the fixed latency compensation value as the latency compensation parameter, when the latency compensation method is using a fixed latency compensation value.

In an implementation, the acquiring module 31 is specifically configured to acquire a valid TA when the latency compensation method is calculating the latency compensation value based on the TA; and calculate the latency compensation value based on the valid TA and a predefined algorithm.

In an implementation, the acquiring module 31 is specifically configured to determine a current TA as the valid TA when the current TA is valid; and acquire the valid TA by measurement when the current TA is invalid.

In an implementation, the acquiring module 31 is further configured to determine whether the current TA is valid or not according to a first information: and where the first information includes at least one of the following information:
state of the UE, the state of the UE including: a radio resource control RRC connected state, an idle state or an RRC inactive state;
whether a time calibration timer of the UE is on or running;
a service characteristic of a latency-sensitive communication TSC service currently running by the UE;
a third indication information, used to indicate whether the UE has established or activated the TSC service; and
latency compensation capability information of the UE.

In an implementation, the acquiring module 31 is specifically configured to send a physical downlink control channel (PDCCH) command or a paging command to the UE; and measure the valid TA during a random access establishment procedure, where the random access establishment procedure is triggered by the UE according to the PDCCH command or the paging command.

In an implementation, the acquiring module 31 is specifically configured to measure the valid TA according to an uplink channel or a random access preamble sent by the UE.

In an implementation, the compensating module 32 is specifically configured to increase or decrease the latency compensation parameter on the basis of reference time corresponding to the reference time information.

In an implementation, the reference time information includes: a reference time and/or a reference frame.

In an implementation, the reference time includes at least one of the following time information: days, seconds, milliseconds, microseconds, ten nanoseconds and nanoseconds.

Figure 15:
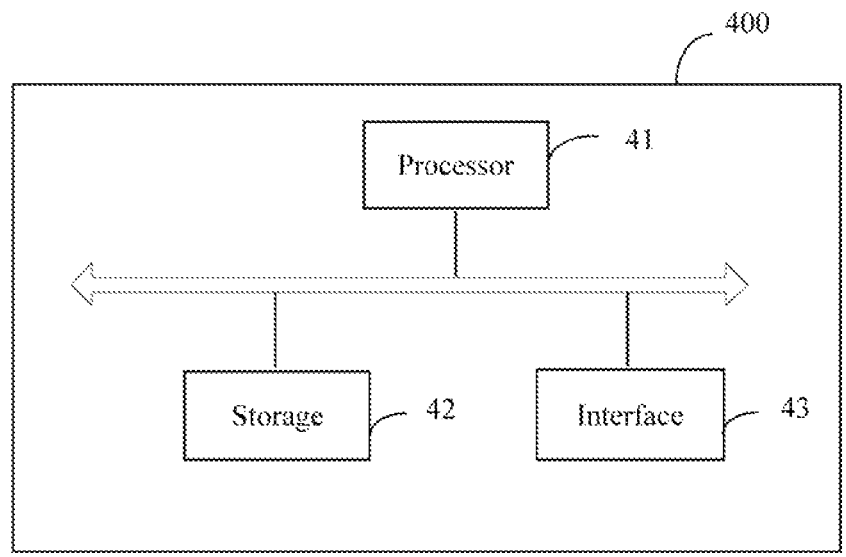
FIG. 15 is a schematic structural diagram of a UE provided in Embodiment 10 of the present application.

FIG. 15 is a schematic structural diagram of a UE provided in Embodiment 10 of the present application, as shown in FIG. 15, the UE 400 includes:

a processor 41, a memory 42, and an interface 43 for communication with other devices;

the memory 42 stores computer execution instructions; and the processor 41 executes computer-executable instructions stored in the memory, so that the processor 41 executes the technical solution executed by the UE in any one of the foregoing method embodiments.

FIG. 15 is a simple design of the UE, the embodiment of the present application does not limit the number of processor and memory in the UE, and FIG. 15 only takes the number of 1 as an example for illustration.

Figure 16:
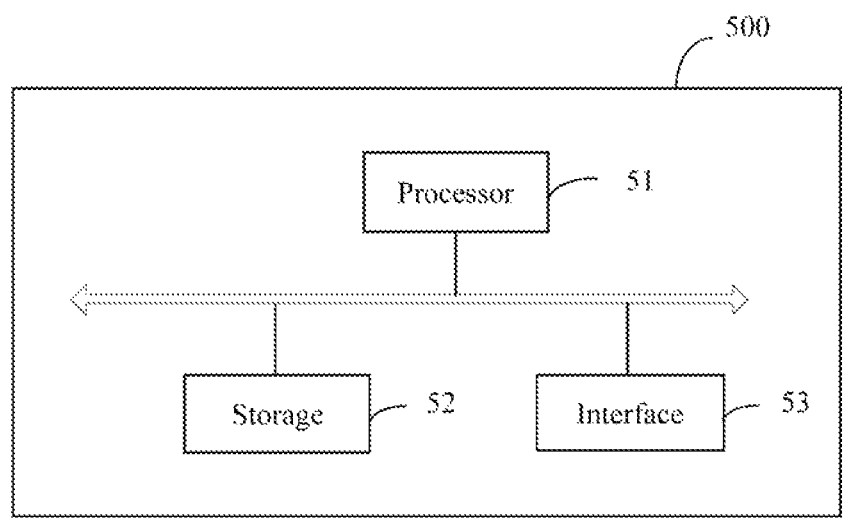
FIG. 16 is a schematic structural diagram of a base station provided in Embodiment 11 of the present application.

FIG. 16 is a schematic structural diagram of a base station provided in Embodiment 11 of the present application, as shown in FIG. 16, the base station 500 includes:

a processor 51, a memory 52, an interface 53 for communication with other devices;

the memory 52 stores computer execution instructions; and the processor 51 executes computer-executable instructions stored in the memory, so that the processor 51 executes the technical solution executed by the base station in any one of the foregoing method embodiments.

FIG. 16 is a simple design of the base station, the embodiment of the present application does not limit the number of processor and memory in the base station, and FIG. 16 only takes the number of 1 as an example for illustration.

In a specific implementation of the UE or base station shown in the above embodiments, the memory, the processor and the interface may be connected through a bus, in an implementation, the memory may be integrated into the processor.

An embodiment of the present application also provides a computer-readable storage medium, wherein computer execution instructions are stored in the computer-readable storage medium, and used to implement the technical solution executed by the UE in any one of the foregoing method embodiments when the computer execution instructions are executed by a processor.

An embodiment of the present application also provides a computer-readable storage medium, wherein computer execution instructions are stored in the computer-readable storage medium, and used to implement the technical solution executed by the base station in any one of the foregoing method embodiments when the computer execution instructions are executed by a processor.

An embodiment of the present application also provides a program, configured to perform the technical solution executed by the UE in any one of the foregoing method embodiments when the program is executed by a processor.

An embodiment of the present application also provides a program, configured to perform the technical solution executed by the base station in any one of the foregoing method embodiments when the program is executed by a processor.

In an implementation, the above processor may be a chip.

An embodiment of the present application also provides a computer program product including program instructions, and the program instructions are configured to implement the technical solution executed by the UE in any one of the foregoing method embodiments.

An embodiment of the present application also provides a computer program product including program instructions, and the program instructions are configured to implement the technical solution executed by the base station in any one of the foregoing method embodiments.

An embodiment of the present application also provides a chip, including a processing module and a communication interface, and the processing module is capable of performing the technical solution executed by the UE in any one of the foregoing method embodiments.

Further, the chip further includes a storage module (for example, a memory), the storage module is configured to store instructions, the processing module is configured to execute instructions stored in the storage module, and the execution of the instructions stored in the storage module causes the processing module to perform the technical solution executed by the UE in any one of the foregoing method embodiments.

An embodiment of the present application also provides a chip, including a processing module and a communication interface, and the processing module is capable of performing the technical solution executed by the base station in any one of the foregoing method embodiments.

Further, the chip further includes a storage module (for example, a memory), the storage module is configured to store instructions, the processing module is configured to execute instructions stored in the storage module, and the execution of the instructions stored in the storage module causes the processing module to perform the technical solution executed by the base station in any one of the foregoing method embodiments.

In the several embodiments provided in the present application, it should be understood that the disclosed device and method may be implemented in other ways. For example, the device embodiments described above are only illustrative, for example, the division of the modules is only a logical function division, and there may be other division ways in actual implementation, for example, multiple modules may be combined or integrated into another system, or some features may be ignored, or not implemented. In addition, the displayed or discussed mutual coupling or direct coupling or communication connection may be through some interfaces. The indirect coupling or communication connection of the modules may be in electrical, mechanical or other forms.

In the specific implementations of the above mentioned base station and UE, it should be understood that the processor may be a central processing unit (English: Central Processing Unit, abbreviation: CPU), or other general-purpose processor, digital signal processor (English: Digital Signal Processor, abbreviation: DSP), application specific integrated circuit (English: Application Specific Integrated Circuit, abbreviation: ASIC), etc. The general-purpose processor may be a microprocessor or the processor may also be any conventional processor or the like. The steps of the method disclosed in the present application may be directly embodied as being executed and completed by a hardware processor, or executed and completed by a combination of hardware and software modules in the processor.

All or part of the steps in the method embodiments described above may be implemented by a program instructing relevant hardware. The above mentioned program may be stored in a readable memory. When the program is executed, it performs the steps including the method embodiments described above; and the above mentioned memory (storage medium) includes: read-only memory (English: read-only memory, abbreviation: ROM), RAM, flash memory, hard disk, solid state drive, magnetic tape (English: magnetic tape), floppy disk (English: floppy disk), optical disc (English: optical disc) and any combination thereof.

What is claimed is:

1. A latency compensation method, comprising:
    acquiring, by a user equipment (UE), a latency compensation parameter; and
    performing, by the UE, latency compensation for reference time information according to the latency compensation parameter;
    wherein the acquiring, by the UE, a latency compensation parameter comprises:
    acquiring, by the UE, the latency compensation parameter according to a latency compensation manner indicated by the base station;
    wherein the acquiring, by the UE, the latency compensation parameter according to a latency compensation manner indicated by the base station comprises:
    acquiring, by the UE, a valid timing advance (TA), when the latency compensation manner is calculating the latency compensation value based on the TA; and
    calculating, by the UE, the latency compensation value according to the valid TA and a predefined algorithm;
    wherein before the acquiring, by the UE, a latency compensation parameter, the method further comprises:
    determining, by the UE, to perform latency compensation for the reference time information according to first latency compensation information sent by the base station and latency compensation capability information of the UE.

2. The method according to claim 1, further comprising:
    receiving, by the UE, the first latency compensation information sent by the base station through a radio resource control RRC message; and
    the first latency compensation information comprises first indication information, wherein the first indication information indicates whether the UE is required to perform latency compensation for the reference time information.

3. The method according to claim 2, wherein the first latency compensation information further comprises the latency compensation parameter, effective time information of the latency compensation, a judgment condition for the UE to perform the latency compensation, second indication information, the latency compensation manner, and a clock identifier of a time sensitive network (TSN), and the second indication information indicates whether the base station has performed latency compensation for the reference time information.

4. The method according to claim 3, wherein when the first latency compensation information comprises the judgment condition for the UE to perform latency compensation, the determining, by the UE, to perform latency compensation for the reference time information comprises:
    measuring, by the UE, a measurement object according to the judgment condition, and acquiring a measurement result, wherein the measurement result comprises at least one of the following parameters: reference signal received power (RSRP), reference signal received quality (RSRQ), signal to interference plus noise ratio (SINR), Road loss; and
    determining, by the UE, to perform latency compensation for the reference time information, when the measurement result meets the judgment condition;
    wherein the latency compensation manner comprises at least one of the following manners: using a fixed latency compensation value, calculating a latency compensation value based on a timing advance (TA), or calculating a latency compensation value based on an implementation of the UE.

5. The method according to claim 1, wherein the acquiring by the UJE a valid TA comprises:
    determining, by the UE a current TA as the valid TA when the current TA is valid; and
    acquiring by the UE, the valid TA through the base station when the current TA is invalid;
    wherein the method further comprises:
    determining, by the UE, whether the current TA is valid or not according to first information; and
    wherein the first information comprises at least one of the following information:
    state of the UE, the state of the UE comprising: a radio resource control (RRC) connected state, an idle state or an RRC inactive state;
    whether a time calibration timer of the UE is on or running;
    a service characteristic of a latency-sensitive communication (TSC) service currently running by the UE;
    third information, used to indicate whether the UE has established or activated the TSC service; and
    the latency compensation capability information of the UE;
    wherein the acquiring by the UE, the valid TA through the base station comprises:
    sending by the UE, a random access preamble to the base station; and
    receiving, by the UE, a random access response sent by the base station, wherein the random access response comprises the valid TA.

6. The method according to claim 5, wherein the number of bits occupied by the valid TA in a format of the random access response is greater than 12, and the valid TA occupies reserved bits;
    wherein the receiving, by the UE, a random access response sent by the base station comprises:
    detecting, by the UE, only in accordance with the format of the random access response.

7. A user equipment (UE), comprising:
    at least one processor and a memory;
    the memory stores computer executable instructions;
    the at least one processor executes the computer executable instructions stored in the memory to:
    acquire a latency compensation parameter; and
    perform latency compensation for reference time information according to the latency compensation parameter;

wherein the processor is specifically configured to:
acquire the latency compensation parameter according to a latency compensation manner indicated by the base station;
acquire a valid timing advance (TA), when the latency compensation manner is calculating the latency compensation value based on the TA; and
calculate the latency compensation value according to the valid TA and a predefined algorithm;
wherein the processor is further configured to:
determine to perform latency compensation for the reference time information according to first latency compensation information sent by the base station and latency compensation capability information of the UE.

8. The UE according to claim 7, wherein the processor is further configured to:
receive the first latency compensation information sent by the base station through a radio resource control (RRC) message; and
wherein the first latency compensation information comprises first indication information, and the first indication information indicates whether the UE is required to perform latency compensation for the reference time information.

9. The UE according to claim 8, wherein the first latency compensation information further comprises the latency compensation parameter, effective time information of the latency compensation, a judgment condition for the UE to perform the latency compensation, second indication information, the latency compensation manner, and a clock identifier of a time sensitive network (TSN), and the second indication information indicates whether the base station has performed latency compensation for the reference time information.

10. The UE according to claim 9, wherein when the first latency compensation information comprises the judgment condition for the UE to perform latency compensation, the processor is specifically configured to:
measure a measurement object according to the judgment condition, and acquire a measurement result, wherein the measurement result comprises at least one of the following parameters: reference signal received power (RSRP), reference signal received quality (RSRQ), signal to interference plus noise ratio (SINR), Road loss; and determine to perform latency compensation for the reference time information, when the measurement result meets the judgment condition;
wherein the latency compensation manner comprises at least one of the following manners: using a fixed latency compensation value, calculating a latency compensation value based on a timing advance (TA), or calculating a latency compensation value based on an implementation of the UE.

11. The UE according to claim 7, wherein the processor is further configured to:
determine a current TA as the valid TA when the current TA is valid; and
acquire the valid TA through the base station when the current TA is invalid;
determine, by the UE, whether the current TA is valid or not according to first information; and
wherein the first information comprises at least one of the following information:
state of the UE, the state of the UE comprising: a radio resource control (RRC) connected state, an idle state or an RRC inactive state;
whether a time calibration timer of the UE is on or running;
a service characteristic of a latency-sensitive communication TSC service currently running by the UE;
third information, used to indicate whether the UE has established or activated a TSC service; and
latency compensation capability information of the UE;
wherein the processor is further configured to:
send a random access preamble to the base station; and
receive a random access response sent by the base station, wherein the random access response comprises the valid TA.

12. The UE according to claim 11, wherein the number of bits occupied by the valid TA in a format of the random access response is greater than 12, and the valid TA occupies reserved bits;
wherein the processor is further configured to:
detect only in accordance with the format of the random access response.

* * * * *